(12) United States Patent
Howard

(10) Patent No.: US 6,904,941 B2
(45) Date of Patent: Jun. 14, 2005

(54) HELICALLY FORMED CYLINDER OF VARYING LENGTH AND DIAMETER

(76) Inventor: David W. Howard, 36 Blue Sky Dr., Westfield, MA (US) 01085

( * ) Notice: Subject to any disclaimer, the term of this patent is extended or adjusted under 35 U.S.C. 154(b) by 0 days.

(21) Appl. No.: 10/246,060

(22) Filed: Sep. 18, 2002

(65) Prior Publication Data

US 2004/0050248 A1 Mar. 18, 2004

(51) Int. Cl.[7] .............................. F16L 9/00; G01B 3/10
(52) U.S. Cl. ....................... 138/167; 138/156; 138/168; 138/128; 138/150; 138/151; 33/555.1; 33/555.4; 285/373; 285/419; 285/298
(58) Field of Search ......................... 138/156, 166–169, 138/151, 150; 33/555.1, 555.4, 755, 759, 561.1, 561.2, 562, 563; 285/373, 419, 424, 298

(56) References Cited

U.S. PATENT DOCUMENTS

| 25,154 | A | | 8/1859 | Wehle | 33/542 |
|---|---|---|---|---|---|
| 225,710 | A | | 3/1880 | Marsh | 600/541 |
| 438,453 | A | | 10/1890 | Wareham | 33/514.1 |
| 490,649 | A | * | 1/1893 | Garretson et al. | 138/169 |
| 632,852 | A | * | 9/1899 | Smith | 138/169 |
| 776,626 | A | * | 12/1904 | Strehlow | 138/169 |
| 912,955 | A | | 2/1909 | Harber | 24/208 |
| 976,029 | A | * | 11/1910 | Birnbaum | 285/334.4 |
| 1,180,859 | A | * | 4/1916 | Lefever | 124/83 |
| 1,264,519 | A | | 4/1918 | Hinson | 72/477 |
| 1,313,633 | A | * | 8/1919 | Hemp | 138/169 |
| 1,343,706 | A | * | 6/1920 | Buller | 138/169 |
| 1,404,601 | A | | 2/1922 | Gordon | 33/555.4 |
| 1,437,050 | A | * | 11/1922 | Firestine | 138/167 |
| 1,672,913 | A | | 6/1928 | Schaap | 33/542 |
| 1,718,983 | A | * | 7/1929 | Schneible | 138/168 |
| 1,828,105 | A | * | 10/1931 | Embree | 138/169 |
| 1,991,802 | A | * | 2/1935 | Holyb | 138/166 |
| 2,006,863 | A | * | 7/1935 | Holub | 138/169 |
| 2,323,256 | A | * | 6/1943 | Thompson | 138/168 |
| 2,483,095 | A | * | 9/1949 | Ingels | 138/168 |
| 2,703,110 | A | * | 3/1955 | Curtis | 285/332 |
| 2,756,778 | A | * | 7/1956 | Curtis | 138/168 |
| 2,825,673 | A | * | 3/1958 | Franz | 138/168 |
| 2,887,607 | A | * | 5/1959 | Millis | 313/261 |
| 2,914,926 | A | * | 12/1959 | Meagher | 138/156 |
| 3,295,560 | A | * | 1/1967 | Demmler | 138/166 |
| 3,486,534 | A | * | 12/1969 | Terkel et al. | 138/158 |
| 3,620,896 | A | | 11/1971 | Glasgow | 428/167 |
| 3,654,049 | A | * | 4/1972 | Ausnit | 24/16 PB |
| 4,333,241 | A | | 6/1982 | Wasik | 33/524 |
| 4,428,385 | A | | 1/1984 | Morales | 600/587 |
| 4,565,012 | A | | 1/1986 | Bilodeau | 33/458 |
| 4,922,622 | A | | 5/1990 | Galloway | 33/542 |
| 5,104,159 | A | * | 4/1992 | Sugiyama et al. | 285/373 |
| 5,167,160 | A | | 12/1992 | Hall | 73/864.91 |
| 5,465,759 | A | | 11/1995 | Carlson et al. | 138/110 |
| 5,527,282 | A | | 6/1996 | Segal | 604/104 |
| 6,032,702 | A | * | 3/2000 | Bearden | 138/166 |
| 6,044,572 | A | | 4/2000 | Sore | 33/555.4 |

FOREIGN PATENT DOCUMENTS

JP        2000-055601        2/2000

OTHER PUBLICATIONS

"How To Use The Tape," pitape.com, 2000, Pi Tape Corporation Escondido, CA.

* cited by examiner

*Primary Examiner*—Patrick Brinson
(74) *Attorney, Agent, or Firm*—Clock Tower Law Group; Erik J. Heels; Joshua D. Mather

(57) ABSTRACT

A variable diameter cylinder made from a sheet having first and second edges that are opposite to each other and that slideably connect with each other to form a helical joint of a cylinder such that sliding the edges of the sheet along the joint varies a diameter and length of the cylinder. When marked with a scale, the cylinder acts as a measuring device that is both highly accurate and easy to use. A helical-based scale can be used alone, or a linear scale can be used in combination with a Vernier scale.

24 Claims, 13 Drawing Sheets

HELICALLY FORMED CYLINDER OF VARYING LENGTH AND DIAMETER

BACKGROUND OF THE INVENTION

1. Field of the Invention

The invention relates to a method and apparatus for forming variable diameter and length cylindrical bodies and the various uses for such cylindrical bodies including, more specifically, a method and apparatus for measuring interior and exterior diameters and circumferences of tubes, pipes, and the like.

2. Description of Prior Art

Variable diameter cylinders are used in a wide variety of applications throughout industry. For example, variable diameter cylinders are used in connecting shafts and bores in mechanical drive trains. In ring form, variable diameter cylinders are used as hose clamps, cable-ties, and pipe fittings.

Variable diameter cylinders are also used for measuring other cylindrical bodies. Diameter measuring devices are used to measure the circumference, diameter, or radius of cylinders, tubes, bores, pipes, discs, rings, spheres, and the like. Precise circumference, diameter, and radius measurements are critical for many applications including, but not limited to, quality control, sizing, and monitoring radial expansion or contraction. The importance of being able to measure cylindrical bodies accurately increases as technology, quality requirements, sophistication, and value of cylindrical components increases. As such, there is a need for accurate devices for measuring cylindrical bodies.

Traditionally, precision diameter measurement devices included calipers, probes, and tapes. This translated into two principal methods of taking a diameter measurement, one for the probes and another for tapes.

Probe-Based Measuring Devices

Standard methods for measuring the inside diameter of hollow cylindrical objects include the use of expanding ball gauges, telescoping gauges, and cylindrical-plug gauges. All three types of gauges have their inherent drawbacks. Hollow cylindrical objects include hoses, pipes, and tubes. To simplify the following discussion, only tubes are referenced.

The expanding ball gauge, or split ball gauge, is a very simple device, which depends upon the operator for an accurate measurement. The end of the gauge with the ball on it is placed inside the tube, and the ball is then opened by twisting the opposite end of the gauge until the ball makes contact with the internal bore being measured. With a tube, which is usually not perfectly round, there is no precise way of knowing what the true setting should be, because the tube has some ovalness, and the contact point, even when adjusted with great care, will usually indent into the surface to a greater or lesser degree depending upon the force of contact and the hardness of the tube. The ball, at its widest point, as measured by a length-measuring device, is taken as the bore diameter. The split ball gauges themselves may be theoretically accurate to within 0.001 inch, but the problems related to the ovalness of the tube and the indentation of the tube at the contact point may be a source of significant error. Variations in readings between experienced operators may range above 0.394 mm (1/64 th of an inch). The same problems exist with dial bore gauges, which display bore diameter with a dial indicator.

Inside calipers are used mostly in the measuring of larger tubes having 150 mm (about six inches) bores and larger. The common practice of averaging readings taken with measuring instruments having point contacts, whether they be split ball gauges, telescoping gauges, inside calipers, etc., does not assure greater accuracy but introduces the possibility that errors may accumulate.

Cylindrical plug gauges are probably the most commonly used instruments for measuring the bore diameter of tubes, especially in the size range of 50 mm (about two inches) and under. To measure the bore diameter, the plug gauge is inserted until the tube is rounded internally and there are no visible air gaps anywhere around the tube between the plug and the internal bore. The force required to accomplish this is often sufficient to expand the tube and give a false reading. Plug gauges are commonly supplied in size increments as low as 0.025 mm (0.001 inch). Also, plug gauges are made with stepped size increases in increments of as small as 0.25 mm (0.010 inch). Another common type of plug gauge is the tapered plug, which is usually provided with graduation marks and increments of 0.025 mm (0.001 inch).

All types of plug gauges typically have the same problems as described above to the extent that variations of readings, even among experienced operators, leads to quality control problems. With the recent emphasis on closer tolerances, a need has arisen for a method to measure internal diameters of tubes with better accuracy.

As previously mentioned, the conventional plug gauge is not very accurate because no two operators can usually agree on just how much force to use to get a perfect fit. When too much force is used, the internal diameter is altered due to stretching of the tube. When not enough force is used, air gaps remain, which lead to a reading that is less than the true internal diameter. When using the plug gauge, the ovalness of the tube is made to conform to the round plug, which in itself requires enough force to induce error in measurement. It takes great skill to learn just how much force to use in inserting the plug to get consistent readings, but no two people will use an identical force when measuring the internal diameter of the tube. Also, tubes vary greatly in firmness, which may require different levels of force in inserting the plug gauge. Moreover, the difficulty in determining the proper fit sometimes results in the plug getting stuck in the tube, problems with disassembly, and damage to parts.

Telescoping gauges have similar problems to the other methods used to measure the internal diameter. One of these problems is due to the fact that in many cases the tube is not a perfect circle, and when the telescoping gauge is inserted, it is not always measuring the widest or most accurate diameter. Depending on the firmness with which the plungers telescope out, they may indent into the inner wall of the tube causing a false reading. Another problem is the dependence on operators to center the gauge squarely in the tube, perpendicular to the tube axis.

Measuring exterior tube diameter using the probe method presents problems similar to those associated with interior diameter measurement. The exterior application of the plug gauge is the solid ring gage. The ring gage is a precision hole of known size, and the tube to be measured is fit into the ring gage. Telescoping gauges can be used on the ends of tubes or on cross sections of tubes to measure across the tube. Additionally, telescoping gauges can have jaws to reach around the tube from the side to fit points on the opposite sides of the tube being measured.

Tape-Based Measuring Devices

Tape-based measuring devices overcome some, but not all, of the problems of probe-based measuring devices.

Tape-based measuring devices are sometimes more accurate than probe-based measuring devices, but they are also more difficult to use.

In the simplest terms, a string is wrapped around a cylindrical body, tensioned, and tied to form the desired circumference or perimeter. The string is marked with a measuring scale so that the desired parameter can be read from the scale. The units on the measuring scale can represent circumference, diameter, or some other unit such as servings of pasta. Strings can break and stretch, however, and are also hard to mark. Tapes improve on the basics of string-based measurements.

The tape method of diameter measurement involves wrapping a graduated flexible tape around a cylinder or inside a tube. A user then observes the size of the cylinder from the graduations. Using a linearly graduated tape, a user can observe the circumference of the cylinder and then divide by pi to calculate the diameter. Other tapes display the diameter or radius instead of a circumference, but this is just a matter of which measuring scale is used. This diameter measurement method is more accurately described as a linear circumference-based measuring method. The common thread of this method is the use of a linear sliding circumferential pathway to align measurement marking and components.

Terminology

In short, all circumference-based measuring methods and devices use unity-based scaling to determine circumference or perimeter and pi-based scaling to determine diameter.

Prior Art Chronology

Devices that incorporate variable diameter cylinders include a number of patents. U.S. Pat. No. 25,154 (Wehle, Aug. 16, 1859) discloses a Conformator, which is a device for measuring hats. The measuring device uses pi-based scaling but has no helical component. Each edge of the tape associates with itself after one wrap in circumferential overlap.

U.S. Pat. No. 225,710 (Marsh, Mar. 23, 1880) discloses a Spirometer, which is a differential pressure airflow device used for measuring respiratory functions. The device includes an inflatable sphere and a narrow strip with a circumferential scale for measuring the sphere. A first tape edge overlaps helically with a second edge after one wrap.

U.S. Pat. No. 438,453 (Wareham, Oct. 14, 1890) discloses a Ring Gage. The ring gage is a hollow drum with an opening or slot on the periphery of the drum. A flexible tape graduated with ring sizes is attached at one end to the inside of the drum and then passes through the slot in the drum on the periphery. The drum slides onto a finger or cylinder and the tape is pulled until the tape cinches around a finger or cylinder, and then a user observes a measurement. While the ring gage measures finger sizes adequately, it cannot make precise measurements. Additionally, a cylinder to be measured must have an open end, and, as such, measuring a pipe that is part of a network would be impractical.

U.S. Pat. No. 912,955 (Harber, Feb. 16, 1909) discloses a Hose Clamp, which is a narrow strip made from a single piece of spring metal that includes a circumferentially or longitudinally oriented ring and an obliquely oriented pair of flat surfaces. The hose clamp is a ring-like band adapted to be hammered together after having been placed upon the hose. The band is split on a plane oblique to the body thereof to provide a scarf joint. The only helical component is the inclination of the mating flat surfaces.

U.S. Pat. No. 1,264,519 (Hinson, Apr. 30, 1918) discloses a Ring Mandrel for shaping, rounding, and dressing bands of various diameters. The Ring Mandrel is conical shaped and is comprised of a series of concentric, cylindrical sections. Each section can form and shape a ring of a certain diameter. The Ring Mandrel is an improved plug gauge, but it is not formed helically, nor can it form other cylinders helically.

U.S. Pat. No. 1,404,601 (Gordon, Feb. 24, 1922) discloses a Watch Crystal Gauge. The gauge includes a scale with graduations and a thumb slide with a window for viewing the graduations. A flexible band forms a loop and attaches to one end of the thumb slide. The loop expands and contracts with the movement of the thumb slide to measure a watch crystal placed within the loop. A Vernier scale improves resolution. The Watch Crystal gauge is limited to measuring objects with open ends. Additionally, the Watch Crystal Gauge cannot measure an inside diameter.

U.S. Pat. No. 1,672,913 (Schaap, Jun. 12, 1928) describes a Micrometer Measuring Tape. The tape consists of a broad "dogleg" body portion with offset ends extending from the body portion. The ends align with each other after wrapping around a cylindrical surface in axial overlap. Schaap includes a primary scale factored by pi to display diameter, and Schaap uses a secondary Vernier scale to facilitate scale-reading resolution. The tape can be used internally or externally, and Schaap explains how to correct the scale for tape thickness. Although the Micrometer Measuring Tape has the potential to measure within one thousandth of an inch, it has some drawbacks. It is often difficult to hold the relatively thin tape parallel for an accurate measurement, especially for measuring large, vertical pipes. A second person or extra time is then needed to affix the tape to a cylinder to ensure the tape remains parallel for an accurate measurement. Additionally, the tape only measures one slice or cross section of a cylinder. For quality control of an extended shaft, numerous iterations would be necessary. Great skill is required to properly align the tape circumferentially, read the correct measurement on the primary scale, read the correct measurement on the Vernier scale, and remember to add the readings to compute the precision result. Precision diameter measurement tapes of the Schaap design are in common use today and include the PI TAPE brand of measuring devices by Pi Tape Corporation. In modern practice, however, the difficulty associated with using Vernier scales has led to user preference for electronic digital displays and other instrumented gauges.

U.S. Pat. No. 3,620,896 (Glasgow, Nov. 16, 1971) discloses a Clamping Tape for securing wires, cable bundles, and the like. The tape is composed of two layers, each with different coefficients of contraction. As one layer is heated or treated, the layer shrinks, thereby pulling on the second layer and making the tape coil. A continuum of parallel serrations controls the direction of curvature of the tape. The tape is a narrow band.

U.S. Pat. No. 4,333,241 (Wasik, Jun. 08, 1982) discloses a Pasta Measurer. The measurer is a flexible tape having a series of calibrations to show an amount of uncooked pasta. A ring device on one end assists in wrapping the tape around a portion of pasta. The measurer connects with the series of calibrations, which are holes along the measurer, to show a pasta amount. The measurer is essentially a variation of the circumferential pi tape with no helix.

U.S. Pat. No. 4,428,385 (Morales, Jan. 31, 1984) discloses a Device For Measuring Male Potency. The device is an elongated, flexible tubular member that forms a loop around an object by feeding into itself axially. Graduations along the device indicate radial expansion of an object. Although the device slides within itself, the device uses the same circumferential pi-based measuring principles as many of the previous patents.

U.S. Pat. No. 4,565,012 (Bilodeau, Jan. 21, 1986) describes a marking and measuring instrument. The instrument is a series of elongated portions each pivotally connected to each other or a flexible segmented sheet. The instrument is used for marking off lines and distances along a cylinder or box. The instrument wraps around a cylinder and provides a straightedge for marking a line. While the instrument facilitates marking, it is not capable of precise measurements because the pre-sized segments cannot be fine-tuned.

U.S. Pat. No. 4,922,622 (Galloway, Apr. 08, 1990) discloses a Measuring Device For The Internal Diameter Of A Tube. The device has a wide measuring tape connected to a shaft. The visible surface of the tape includes a measuring scale. The tape is inserted into a cylindrical body and allowed to spring open against the inner wall of the cylindrical body. A measurement can then be obtained for the internal circumference of the cylindrical body or the internal diameter of the cylindrical body. The tape is read along a circumferential scale, and units are divided by pi so that diameter is displayed. While this device is an improvement over other methods of measuring the inside diameter of cylindrical bodies, including expanding ball gauges, telescoping gauges, or cylindrical-plug gauges, the tape must align in parallel with itself and in circumferential overlap.

U.S. Pat. No. 5,167,160 (Hall, Dec. 01, 1992) discloses a Positioning Device for Presenting Samples for Electromagnetic Analysis. While this device includes a cylindrical body with a variable diameter, only the diameter of the center portion of the cylindrical body varies, and the diameter of the ends of the cylindrical body remains constant. For a section, the surface area is not constant and the distance between the elements is not fixed. As a toy, this arrangement is known as a Chinese finger grip. The Chinese finger grip approach has other applications, such as securing electrical cables.

U.S. Pat. No. 5,465,759 (Carlson et al., Nov. 14, 1995) discloses a Variable Diameter Pipe Protector for use in downhole drilling operations such as oil drilling. The protector includes at least one rubber flap attached to the inside surface to compensate for undersize pipe diameters, thereby allowing the protector to be used on pipes of varying diameter. The flaps, however, have no helical component.

U.S. Pat. No. 5,527,282 (Segal, Jun. 18, 1996) discloses a Vascular Dilation Device and Method. This variable diameter cylindrical object is used to allow blood to flow through a vessel. The cylinder is formed of a plurality of flexible elongated elements each of which extends helically about the longitudinally extending central axis. By shortening the cylinder length, the helical pitch is reduced, the distance between the helical elements is reduced, and the overall diameter is increased. Like the Hall device, this is a Chinese finger grip, and as the center portion of the cylinder expands, the cylindrical surface area of a section is not constant.

Japanese Patent Application 10-242537 (Kusano Norio, published Feb. 24, 2000) discloses a Tape Measure to Read Directly Diameter or Circumferential Length. Schaap corrects for tape-width errors by including a dogleg portion in the measuring tape and improved accuracy by including a secondary Vernier scale. This application uses helical calculations, namely the Pythagorean theorem, to eliminate the dogleg and correct for tape width error. The Vernier scale is linear and is designed to work with pi-based measurements, namely measurements that are taken perpendicular to the cylinder's axis. In the case of this invention, measurements are taken helically, not perpendicular to the cylinder's axis, and this comprises the linearity, and ultimately accuracy, of the Vernier scale. The primary advantage over Schaap is reduced cost, since no dogleg is required, thereby simplifying manufacturing of the device, but the tradeoff is reduced accuracy.

U.S. Pat. No. 6,044,572 (Sore, Apr. 04, 2000) discloses a Pipe Ruler. This circumferential measuring device is used for determining a particular company's brand of pipe insulation and is another example of a non-helical measuring device.

Prior Art Summary

As described in the prior art chronology, variable diameter and variable length cylindrical objects are used for hose clamps (Harber), forming rings (Hinson), wire wraps (Glasgow), medical positioning devices (Hall), pipe protectors (Carlson), and vascular dilators (Segal). Variable diameter and variable length cylindrical objects are also used for measuring other objects. Circumference-based measuring devices are used to measure specific things such as hats (Wehle), respiratory function (Marsh), fingers (Wareham), watch crystals (Gordon), pasta (Wasik), male potency (Morales), and pipe insulation (Sore), as well as cylinders generally (Schaap, Galloway, Kusano Norio). The general-purpose measuring devices (Schaap, axial overlap; Galloway, circumferential overlap; Kusano Norio, helical overlap) strive to produce accurate measurements primarily by using pi-based unity circumferential scaling and provide some other way to compensate for or avoid tape width errors.

While improving on probe-based measuring devices, tape-based measuring devices have several flaws. First, tape-based measuring devices can be difficult to use. For a typical PI TAPE marked in inches, the bottom side of the tape has a primary scale with divisions marked at every 0.025 inch (40 divisions per inch). The top side of the tape has a secondary Vernier scale with 25 divisions marked at every 0.001 inch. The tape must be wrapped around a cylinder by applying five pounds of pressure to the tape and placing the dogleg on one side of the cylinder so that the primary scale and the secondary scale meet in axial overlap. From the primary scale, the user must read the division to the immediate left of the zero-point on the primary scale. Then the user must find the point on the Vernier scale where a division on the Vernier scale aligns perfectly with a division on the primary scale. When this number is found on the Vernier scale, it is added to the reading from the primary scale to calculate the total diameter.

Second, tape-based measuring devices may require multiple measurements. Tape-based measuring devices such as PI TAPE are designed to be narrow to minimize errors caused by the width of the tape. However, the narrowness of the tape introduces two new errors. First, because the tape is narrow, it is possible for the tape to wrap at a slight angle, namely not perpendicular to the axis of the cylinder being measured. Also, it is possible to have slight variations in cylinder diameter. With tapes, measurements may be required at multiple points on a cylinder, and this can be time consuming.

Third, tape-based measuring devices can produce inaccurate measurements. Errors can results from not applying the proper tension, reading the primary scale incorrectly, reading the secondary scale incorrectly, and/or calculating the total measurement incorrectly. Tapes must be held in position during measurement by a fixture, adhesive tape, or, more typically, both of the operator's hands.

Consequently, a need exists for an improved measuring device. Namely a measuring device that is 1) easy to use, 2) requires a single measurement, and 3) produces accurate results from use to use.

BRIEF SUMMARY OF THE INVENTION

The present invention uses a variable cylindrical surface to measure a cylindrical surface. The variable cylindrical surface is made by forming a sheet into a cylinder such that ends with the measuring scale meet helically to form a Sliding Joint, whereby the cylindrical shape can be adjusted to transform length with circumference. The sheet is designed to fit inside or wrap outside of a cylinder. When the opposite sides meet, the inside or outside diameter of the cylinder can be read from the measuring scale, and the resulting measurement is more accurate than that produced with circumferential-based measuring devices.

Alternatively, the sheet can be preformed into a variable length and diameter tube by having the Sliding Joint be a slideable joint that allows a user to change the length and diameter of the tube by sliding the joined pieces along the sliding pathway. The sliding joint can be configured in many ways, including as a butt joint, overlap joint, male/female joint, a hook joint, t-joint, or bridge joint.

Objects

An object of the invention is to provide a measuring device that is easy to use, namely one that can be put in place easily on the cylinder to be measured and one that has a scale that is easy to read.

Another object of the invention is to provide a device that can measure a cylinder with one measurement, namely one that does not require measuring the cylinder in multiple places.

Another object of the invention is to provide a measuring device that is inherently accurate, and specifically one that does not have its accuracy limited to unitary circumferential scaling.

Features

A feature of the invention is the sliding joint, namely the part where opposite sides of the sheet meet. The opposite sides meet, after one wrap, to form a joint, and the joint can be, for example, a butt joint, overlap joint, male/female joint, hook joint, t-joint, bridge joint, or another joint configuration.

Another feature of the invention is that it is self-aligning with the cylinder being fit. To fit an exterior cylindrical surface, it may be desirable to pre-form the sheet so that in its relaxed state, the sheet forms a cylinder slightly smaller than that of the diameter being fit. Here, spring force is predetermined to produce a gauge that will stay where placed when released by the operator. For the interior, a flat sheet, when flexed and fit into a cylinder, can be fixed in place by fitting alone, allowing for hands-free observation of the scale.

Another feature of the invention is that it uses helical geometry to produce highly accurate measurements. Linear diameter measurements, as with probe measurements, scale diameter by one. Tape-style perimeter or circumferential measurements scale diameter by pi, and equivalently, circumference by one. Helical measurements go the next degree and scale diameter by more than pi and circumference by more than one. Diameter is a one-dimensional measurement. Circumference is a two-dimensional measurement. This invention involves a three-dimensional measurement that produces scaling beyond that provided by the prior art. The circumferential scaling increases from one, where circumference is infinite compared to sheet width, and approaches infinity at its limit, as the circumference of the helical-based measuring device reduces to equal sheet width. In other words, helical-based measuring is more accurate than circumference-based or diameter-based measuring.

Another feature of the invention is that it is a variable length and variable diameter cylindrical section that varies uniformly, namely such that the length of the cylindrical section increases as the diameter decreases, such that the length of the cylindrical section decreases and the diameter increases, such that the diameter of the cylindrical section remains constant throughout the section, and such that the cylindrical surface area of the formed cylindrical section remains constant.

Advantages

An advantage of the invention is that users can learn how to use it quickly. The sheet forms quickly into a cylinder that can wrap outside of a cylinder or inside of a hollow cylinder. There is no dogleg component to deal with, and users do not need to worry about aligning the device perpendicular to the axis of the cylinder being measured. The device is designed to fit helically, outside or inside of the cylinder to be measured, to produce a three-dimensional cylindrical fit rather than a two-dimensional circumferential fit or a one-dimensional diametrical fit.

Another advantage of the invention is that it measures in one step, eliminating the need for multiple measurements of a cylinder. The wide strip covers a large length section of the cylinder to be measured. This provides an accurate measurement of the section that is covered in one measurement, whereas narrow tape measuring devices may require several iterations.

Another advantage of the invention is that it is highly accurate. With circumference-based measuring, an increase of one unit in circumference results in a geometrical scale change of one. Because the invention is not limited to measuring circumferentially, the measuring scale is not limited in accuracy to unity with circumference. At its minimum, the accuracy of the invention's perimeter or circumferential scale is a factor of one to one, and at the limit, the accuracy of the invention's scale approaches infinity. The invention matches the accuracy of the prior art while using just one scale. If a second Vernier scale is added, the invention is on the order of ten times more accurate than the prior art. Prior art measuring devices, such as the PI TAPE measuring device, are accurate to about one thousandth of an inch.

Another advantage of the invention is that it can be used to measure the perimeter of non-round or oval bodies. In other words, the invention can measure the circumference of round bodies and the perimeter of non-round or oval bodies.

Another advantage of the invention is that it has non-measuring applications, including a force magnifier, conical sections, and a child's toy.

DETAILED DESCRIPTION OF THE INVENTION, INCLUDING THE PREFERRED EMBODIMENT

Figure 1:
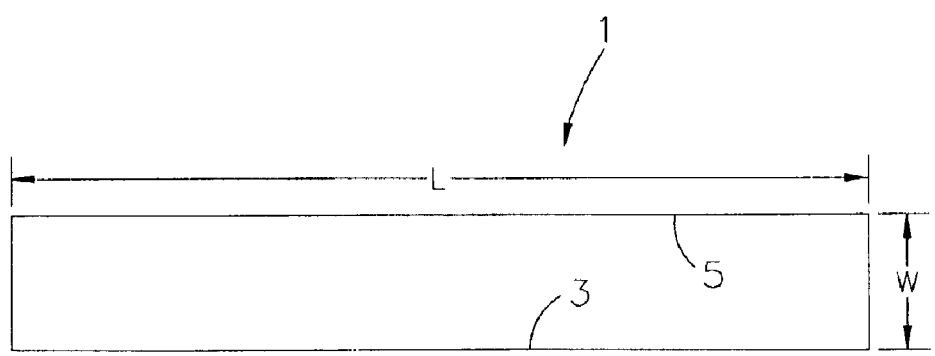
FIG. 1 shows sheet 1 of a predetermined length L, measured along parallel sheet edges 3 and 5, and width W, measured as the perpendicular distance between edges 3 and 5.

FIG. 1 shows sheet 1 of a predetermined length L, measured along parallel sheet edges 3 and 5, and width W, measured as the perpendicular distance between edges 3 and 5. The sheet is wrapped, bringing edges 3 and 5 together, to compose the convolute cylinder 2 of FIG. 2. When forming the minimum circumference, the sheet is wrapped convolutedly with a helical movement M equal to zero and perimeter equal to sheet width. A joint 7 is composed, by having the lengthwise sheet edges 3 and 5 meet, and joint 7 runs parallel with the longitudinal axis of the cylinder. Here, circumference C, is equal to sheet width W, and cylinder length $L_a$ is equal to the sheet length L. As the tube is twisted or articulated end to end, the seam takes a progressively helical form, and because the sheet surface area is predetermined by the sheet, the cylindrical surface exchanges length for circumference. It is to be understood that because the axial geometry of the ends varies as the cylinder is manipulated, $L_a$ represents the average length of the cylindrical section.

Figure 2:
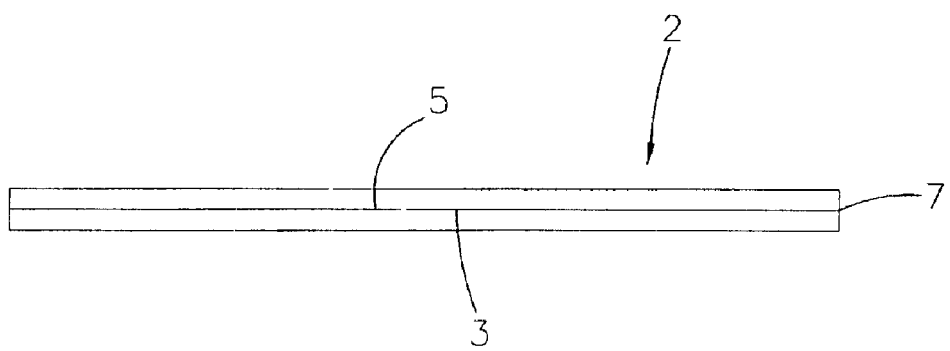
FIG. 2 shows a convolute cylinder 2 formed from the sheet shown in FIG. 1. Sheet edges 3 and 5 meet at joint 7.
Figure 3:
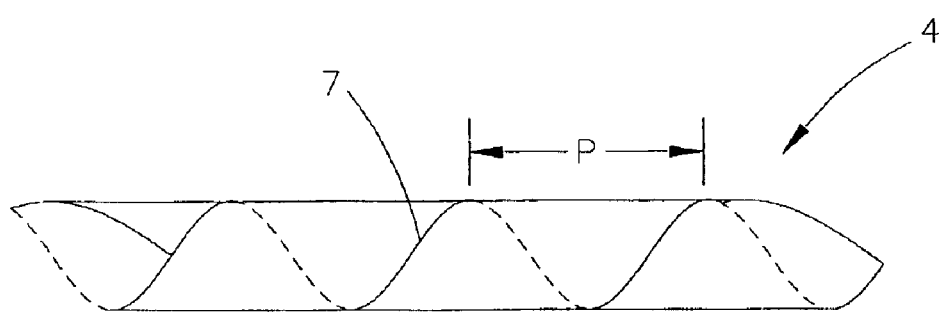
FIG. 3 shows a larger circumference and shorter length cylinder 4 formed from the cylinder 2 shown in FIG. 2 by sliding the sheet edges 3 and 5 against each other along joint 7. The pitch P of the cylinder is also indicated.

By manipulating this meeting of the sheet edges, an apparatus can be articulated to form different size cylindrical shapes of a constant sectional surface area as determined by the predetermined area and shape of the composition sheet. The cylinder 2 of FIG. 2 is transformed into the larger circumference and shorter length cylinder 4 of FIG. 3 by sliding the sheet edges 3 and 5 against each other along joint 7.

Figure 4:
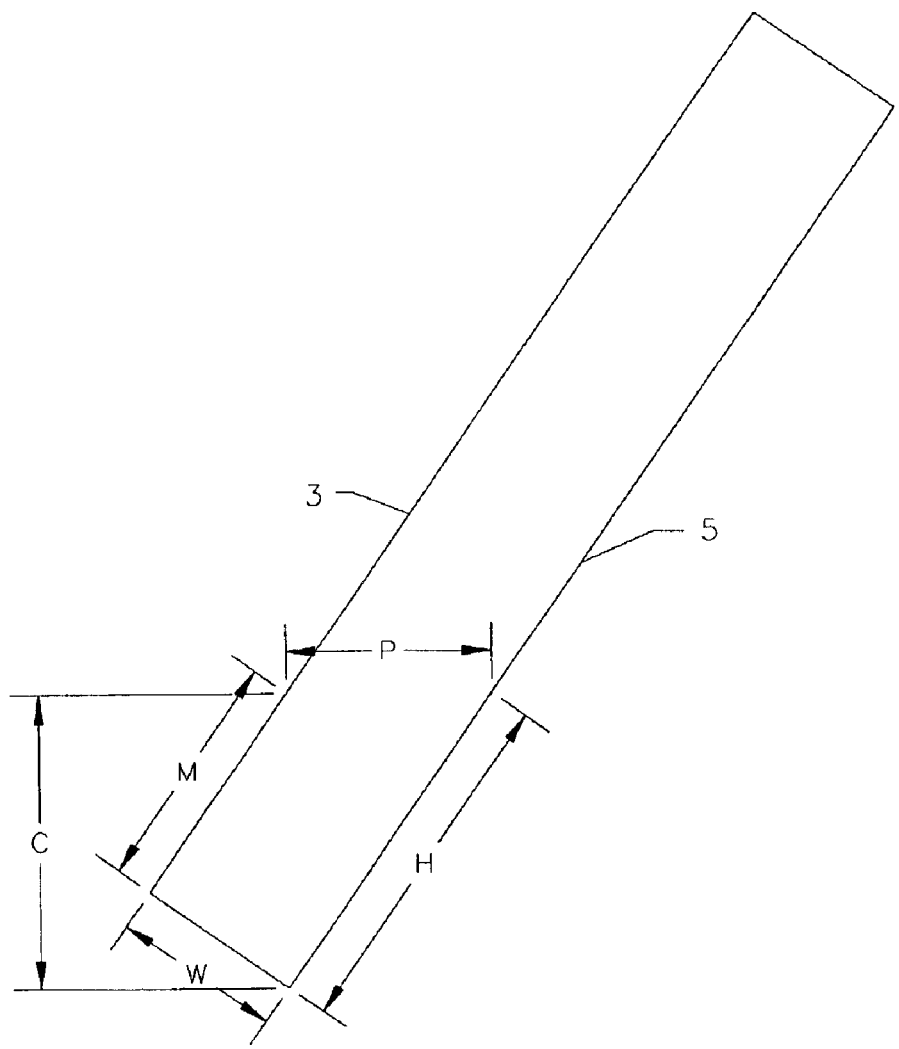
FIG. 4 shows helical distance or helical movement M between two perpendicular mating points on opposite edges of the sheet. The helical seem length H for one wrap of the sheet is also indicated.

FIG. 4 shows helical distance or helical movement M between two perpendicular mating points on opposite edges of the sheet. The helical seem length H for one wrap of the sheet is also indicated. With M fixed, the apparatus has a uniquely corresponding fixed circumference and length.

Figure 5:
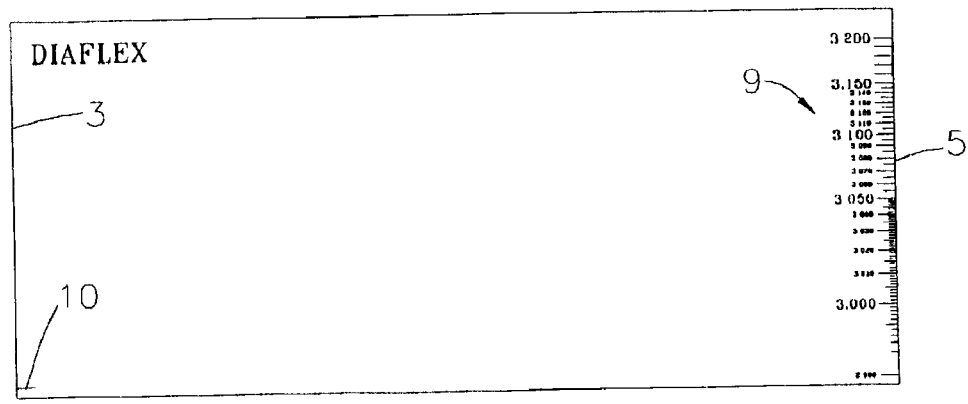
FIG. 5 shows the measuring device with opposite edges 3 and 5 and with scale 9 marked alongside edge 5 and a reference line 10 alongside edge 3.
Figure 6:
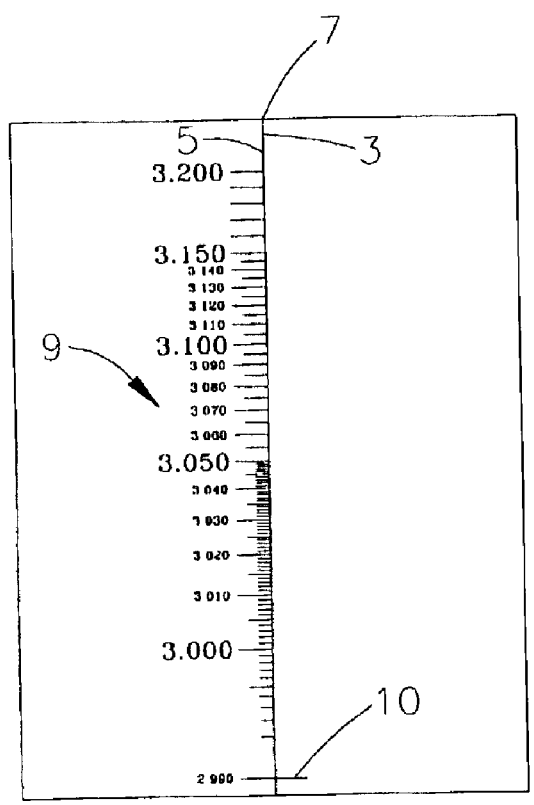
FIG. 6 shows the measuring device of FIG. 5 with a helical movement M of zero and a measurement of 2.990 inches displayed next to reference line 10.
Figure 7:
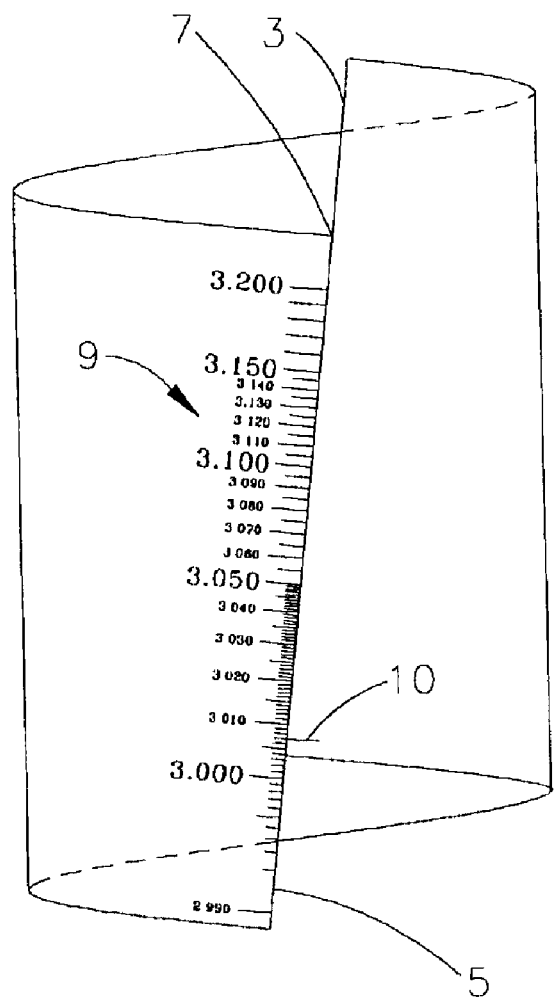
FIG. 7 shows the measuring device with a non-zero helical movement M and a measurement of 3.007 inches displayed next to reference line 10.

FIG. 5 shows a measuring device with opposite edges 3 and 5 and with scale 9 marked next to edge 5. FIG. 6 shows the measuring device of FIG. 5 with a helical movement M of zero and a displayed measurement of 2.990 inches. FIG. 7 shows the measuring device with a non-zero helical movement M and a displayed measurement of 3.007 inches. Note that the scale is non-linear.

Ideally the sheet is made out of a material that is a composite of materials with positive and negative coefficients of expansion such that the overall coefficient of expansion of the sheet is zero. Sheets can also be made out of materials with coefficients of expansion that match the materials being measured. For example, if one is measuring steel, then a steel sheet may be used.

The shape of the cylindrical surface can be describe by two quadratic equations:

$$C^2 = W^2 + M^2 \text{ and}$$

$$H^2 = C^2 + p^2 \text{ where:}$$

C=circumference;
W=sheet width;
M=helical distance or helical movement between two perpendicular mating points on opposite edges of the sheet;
H=the helical seam length for one wrap of the sheet; and
P=pitch, the cylinder length of one wrap of the sheet.

The surface area for one wrap is the sheet area of one turn: area=C×P=W×H. With these three independent equations, we can solve for the following:

Circumference=C=$(W^2+M^2)^{1/2}$
Pitch=P=(W×H)/C
Helical length for one turn/wrap=H=$(C^2+p^2)^{1/2}$
Helical movement=M=$(C^2-W^2)^{1/2}$ The sheet necessarily has a non-zero thickness. As such, the measuring scale must correct for this thickness. As a sheet of some thickness T is bent and wrapped into a cylindrical shape, the interior surface contracts and the exterior surface expands. Within the sheet, between the sheet surfaces, is the neutral axis, or the axis without strain. At the sheet surface, any measurements or markings done to the flat sheet reflect the characteristics of the neutral axis after bending. For the values to reflect characteristics of a sheet surface, we may correct by the distance to the neutral axis, n, which, in the case of diameter, counts twice because the distance to the neutral axis affects the diameter at both ends of the diameter making for a correction of 2 n. In a homogeneous material such as steel, the neutral axis is half way between the surfaces at ½T, which simplifies to a diametrical correction of T. Circumference varies with the factor π yielding a circumferential correction of 2 nπ, which, when n=½T, simplifies to πT.

For the exterior cylinder measurement, correct for the sheet thickness by adding πT to the number calculated for the neutral axis. For interior cylinder measurement, correct for the sheet thickness by subtracting $\pi T$ from the number calculated for the neutral axis.

Figure 8:
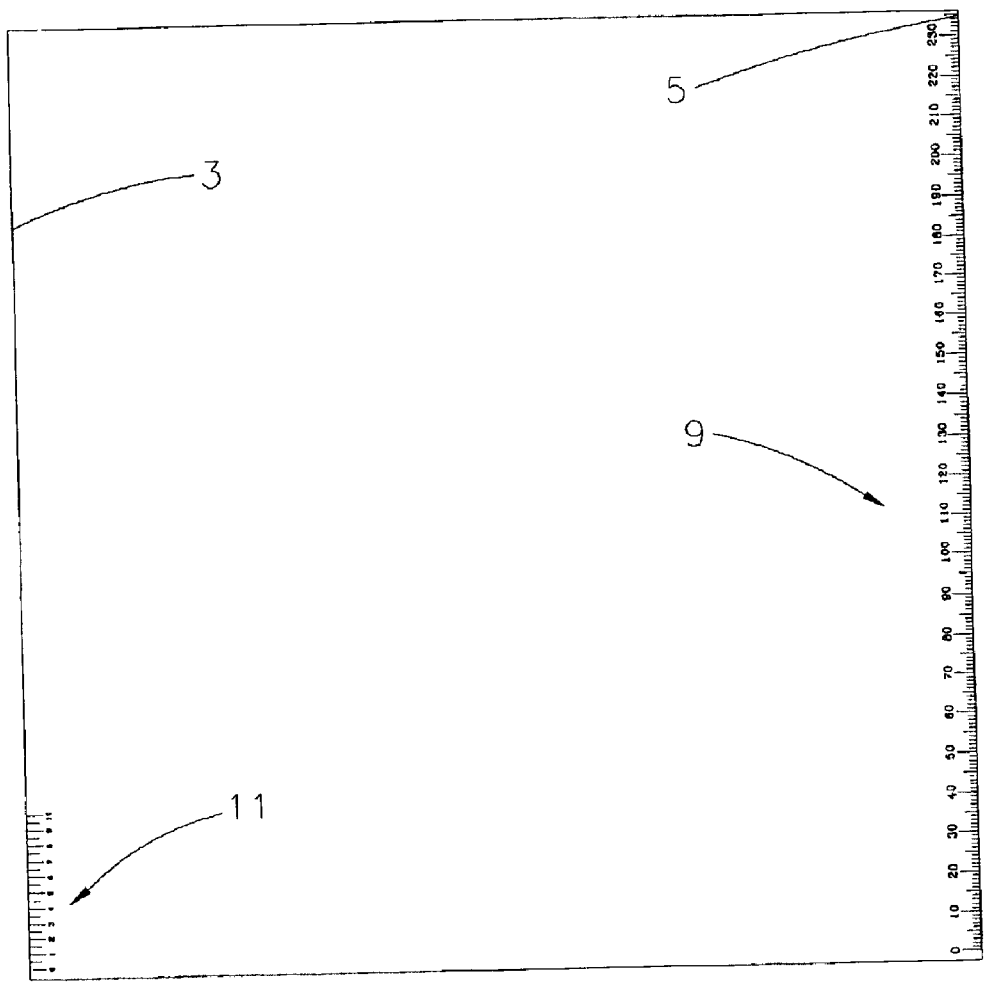
FIG. 8 shows the measuring device with opposite edges 3 and 5, with a linear scale 9 marked alongside edge 5, and with a Vernier scale 11 marked alongside edge 3.
Figure 9:
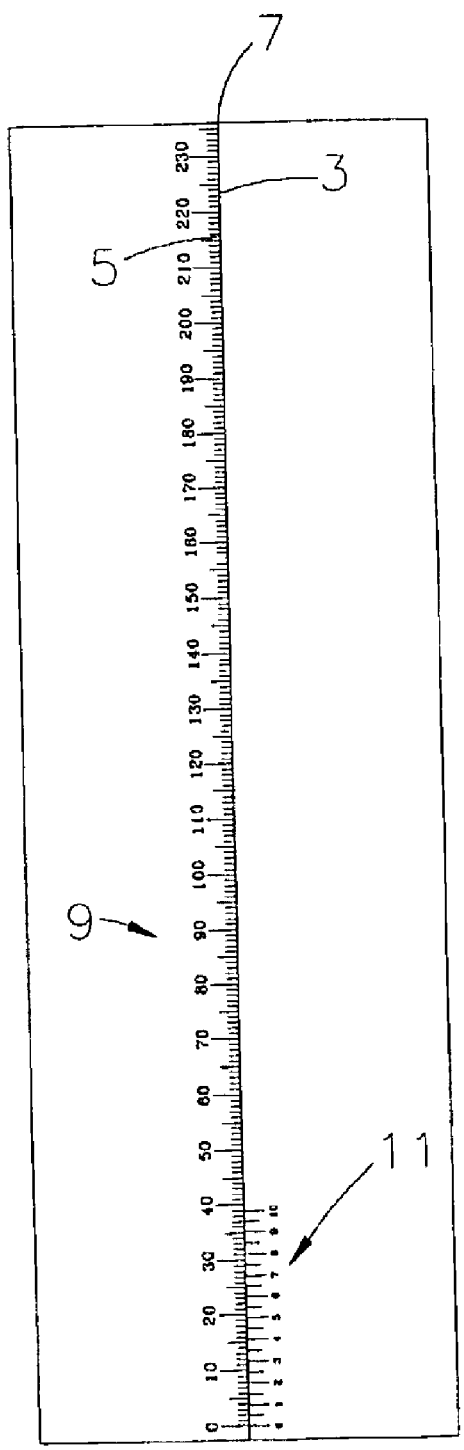
FIG. 9 shows the measuring device of FIG. 8 with a helical movement M of zero.

Alternately, as shown in FIG. 8 and FIG. 9, the measuring device can be marked with a primary scale 9 that is linear and a secondary Vernier scale 11. Since M varies linearly, a linear scale can be used. Here, the scale displays M, which can be used to compute C as above.

Figure 10A:
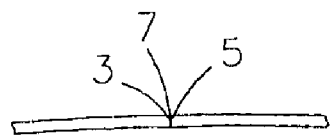
FIG. 10a shows an example of edges 3 and 5 of the sheet meeting to form a butt joint.
Figure 10B:
FIG. 10b is a variation of the joint shown in FIG. 10a and shows a single path overlap joint.
Figure 10C:
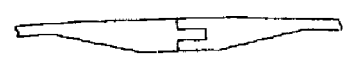
FIG. 10c is a variation of the joint shown in FIG. 10a and shows a male/female joint.
Figure 10D:
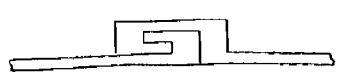
FIG. 10d is a variation of the joint shown in FIG. 10a and shows a hook joint.
Figure 10E:
FIG. 10e is a variation of the joint shown in FIG. 10a and shows a t-joint.
Figure 10F:
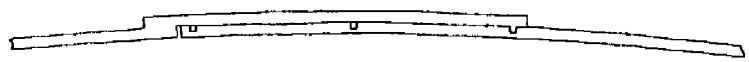
FIG. 10f is a variation of the joint shown in FIG. 10a and shows a multiple path overlap joint.

Another embodiment, as shown in FIG. 10f, is a multiple path overlap joint. The scales can be printed next to the grooves so that the proper scale is read according to which groove is engaged. With this method, one sheet can be used to measure over a larger range of sizes. In this example, the pathway is not necessarily at the sheet extremities. The edge or profile that forms the helical pathway does not need to be at the sheet extremity.

Figure 10G:
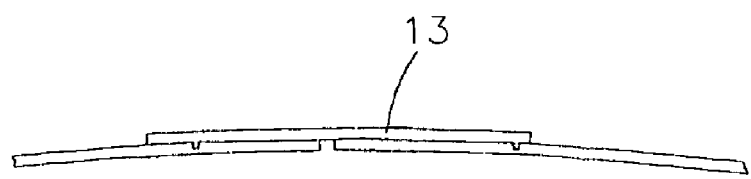
FIG. 10g is a variation of the joint shown in FIG. 10a and shows a bridge joint.

Another embodiment, as shown in FIG. 10g, is a bridge joint. Here, the sheet edges meet through an intermediary bridge 13. Bridges of differing widths can be produced, each with corresponding scales. Using a standard sheet, multiple bridges of differing widths can be used to extend the high-resolution measurement range of any given sheet.

Figure 11:
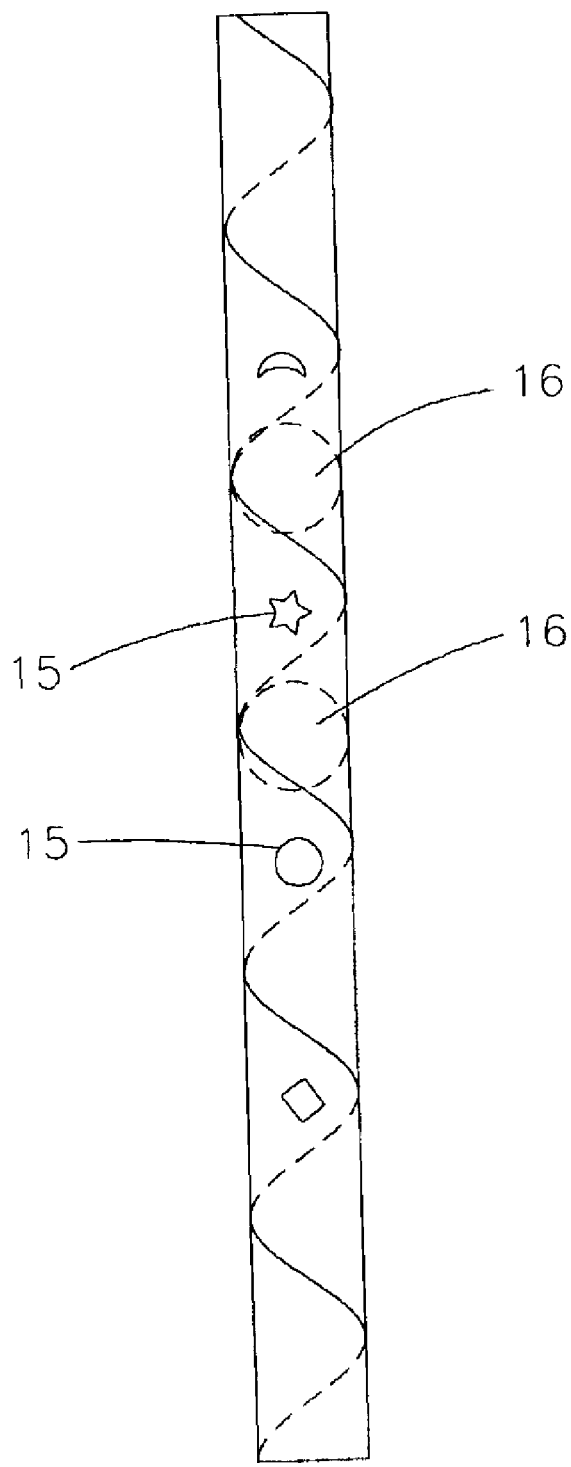
FIG. 11 shows an embodiment of the invention that is a toy.

Another embodiment is shown in FIG. 11. This embodiment is designed to be a child's toy. The sheet has one or more holes 15. Molding clay such as PLAY-DOH is placed inside the tube and packed at each end with wadding such as foam balls 16. As the cylinder is twisted towards the convolute position, the interior volume decreases, causing the PLAY-DOH to be extruded through the holes 15. With appropriate valves, a pump can be produced. Pumping action is achieved by alternate twisting.

Figure 12:
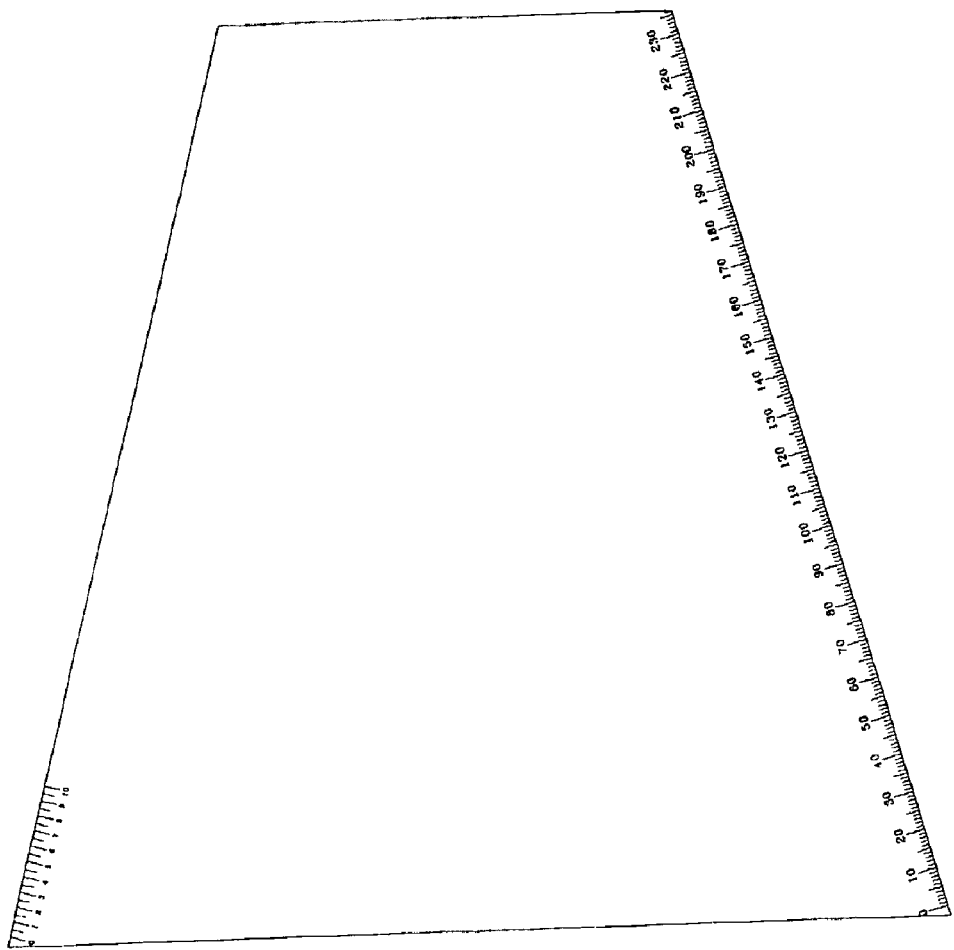
FIG. 12 shows an embodiment of the invention that forms a conical section.
Figure 13:
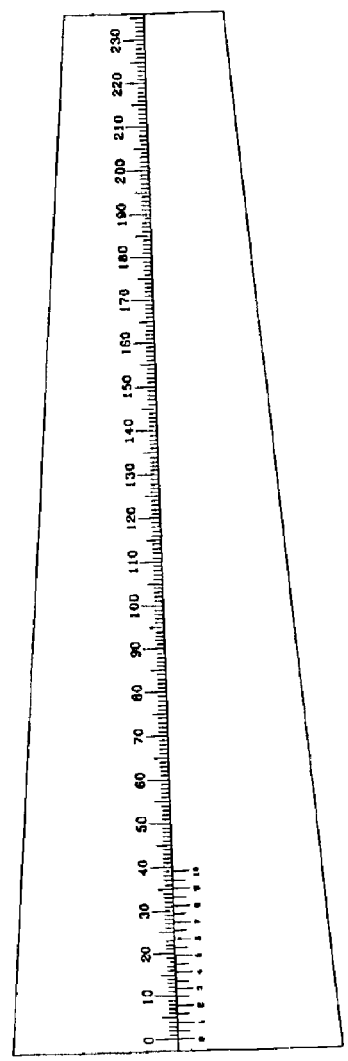
FIG. 13 is a closed view of the device shown in FIG. 12.

Another embodiment is shown in FIG. 12 and FIG. 13. In this embodiment, the opposite sides meet to form a conical section.

Another embodiment calls for using the geometrical magnification as a force magnifier. By managing friction, we can take advantage of the geometrical leverage in a force multiplier such as is done with a lever to achieve mechanical advantage. For example, in the art of connecting things, it is well known that an advantageous mechanical fit is beneficial. The invention can be applied, so that the sheet width is nearly equal to the circumference being fit, so that after positioning, the cylinder can be articulated to come in greatly magnified compression or expansion against the article to be fit. A liquid may act as a lubricant during fitting, and as an adhesive after time, creating a superior mechanical connection.

I claim:

1. A variable diameter cylinder used for measuring a circumference or diameter of a substantially cylindrical surface comprising:
    a sheet having a first edge and a second edge, wherein said first edge and said second edge are opposite to each other, and wherein said first edge and said second edge meet to form a sliding joint, and wherein said first edge and said second edge slide along said sliding joint to vary the diameter of said cylinder; and
    a measuring scale along said first edge and a reference line along said second edge, wherein said measuring scale and said reference line helically align with said circumference of said cylindrical surface.

2. The cylinder of claim 1 wherein said measuring scale is adapted for measuring exterior circumferences or diameters.

3. The cylinder of claim 1 wherein said measuring scale is adapted for measuring interior circumferences or diameters.

4. The cylinder of claim 1 wherein said sliding joint is selected from the group consisting of butt joint, male/female joint, hook joint, t-joint, overlap joint, end bridge joint.

5. The cylinder of claim 1 wherein said sheet is preformed so that in a relaxed state said sheet is substantially cylindrical.

6. The cylinder of claim 1 wherein said measuring is accomplished without having to use a dogleg component on said sheet.

7. The cylinder of claim 1 further comprising one or more holes on said sheet, wherein material can flow from one side of said sheet to the other side of said sheet through said one or more holes.

8. A variable diameter cylinder used for measuring a circumference or diameter of a substantially cylindrical surface comprising:
    a sheet having a first edge and a second edge, wherein said first edge and said second edge are opposite to each other, wherein said first edge and said second edge meet to form a sliding joint, and wherein said first edge and said second edge slide along said sliding joint to vary the diameter of said cylinder; and
    a measuring scale along said first edge and a reference line along said second edge, wherein said measuring scale and said reference line helically align with said circumference of said cylindrical surface, wherein said measuring is accomplished without having to align said measuring scale and said reference line perpendicularly with said circumference of said cylindrical surface, and wherein said measuring is accomplished without having to use a dogleg component on said sheet.

9. The cylinder of claim 8 wherein said sheet is provided with one or more holes, whereby material can flow from one side of said sheet to the other side of said sheet through said one or more holes.

10. A device for measuring a circumference or diameter comprising:
    a flexible sheet having first and second opposing, parallel edges, said first edge having a measuring scale, wherein said measuring scale is calibrated using helical geometry, said second edge having at least one reference line for reading measurements from said measuring scale, whereby bending or rolling said sheet causes said first edge and said second edge to slideably abut along a sliding joint, thereby providing a device for measuring a circumference or diameter.

11. The device of claim 10 wherein said measuring scale is adapted for measuring exterior circumferences or diameters.

12. The device of claim 10 wherein said measuring scale is adapted for measuring interior circumferences or diameters.

13. The device of claim 10 wherein said sliding joint is selected from the group consisting of butt joint, male/female joint, hook joint, t-joint, overlap joint, and bridge joint.

14. The device of claim 10 wherein said measuring of said circumference or diameter is accomplished with a single measurement.

15. The device of claim 10 wherein said measuring is accomplished without having to use a dogleg component on said sheet.

16. A device for measuring a circumference or a diameter comprising:
    a hollow cylinder with a helical sliding joint wherein edges of said sliding joint slide against each other to vary the diameter of said cylinder; and
    a measuring scale positioned along said sliding joint, wherein said measuring scale is calibrated using helical geometry end adapted for making measurements by sliding said edges along said sliding joint.

17. The device of claim 16 wherein said measuring scale is adapted for measuring exterior circumferences or diameters.

18. The device of claim 16 wherein said measuring scale is adapted for measuring interior circumferences or diameters.

19. The device of claim 16 wherein said sliding joint is selected from the group consisting of butt joint, male/female joint, hook joint, t-joint, overlap joint, and bridge joint.

20. The device of claim 16 wherein said measuring is accomplished without having to align said measuring scale and said reference line perpendicularly with said circumference of said cylindrical surface.

21. The device of claim 16 wherein said measuring is accomplished without having to use a dogleg component on said sheet.

22. A method for measuring interior and exterior circumferences or diameters of cylindrical bodies comprising the steps of:

providing a sheet having opposing ends and a measuring scale calibrated using helical geometry;

forming said sheet into a convolute cylinder such that said opposing ends of said sheet meet helically to form a sliding joint;

wrapping said sheet on the interior or exterior of a cylindrical body to be measured;

adjusting said sheet to transform length with circumference until said opposing ends meet; and reading the inside or outside initial measurement from said measuring scale.

23. The method of claim 22 further comprising, correcting for sheet thickness by adding a circumferential correction to said initial measurement to produce a final measurement for exterior measurements and by subtracting a circumferential correction from said initial measurement to produce a final measurement for interior measurements.

24. A variable diameter cylinder used for measuring a circumference or diameter of a substantially cylindrical surface comprising:

a sheet having a first edge and a second edge, wherein said first edge and said second edge are opposite to each other, wherein said first edge and said second edge meet to form a sliding joint, and wherein said first edge and said second edge slide along said sliding joint to vary the diameter of said cylinder; and a first Vernier measuring scale along said first edge and a second Vernier measuring scale along said second edge, wherein said first Vernier measuring scale and said second Vernier measuring scale helically align with said circumference of said cylindrical surface, wherein said measuring is accomplished without having to align said first Vernier measuring scale and said second Vernier measuring scale perpendicularly with said circumference of said cylindrical surface, and wherein said measuring is accomplished Without having to use a dogleg component on said sheet.

* * * * *